United States Patent [19]

Eide et al.

[11] Patent Number: 5,131,062
[45] Date of Patent: Jul. 14, 1992

[54] FIBER OPTIC SENSOR MODULE

[75] Inventors: John E. Eide, Fincastle; Teddy W. Leonard, Troutville, both of Va.

[73] Assignee: Alcatel NA Cable Systems, Inc., Claremont, N.C.

[21] Appl. No.: 657,833

[22] Filed: Feb. 20, 1991

[51] Int. Cl.$^5$ ............................ G02B 6/26; G02F 1/00
[52] U.S. Cl. ........................ 385/12; 385/13; 250/227.11
[58] Field of Search ............... 350/96.15, 96.16, 96.20, 350/96.29; 356/73; 250/227, 559; 455/610–613

[56] References Cited

U.S. PATENT DOCUMENTS

| | | | |
|---|---|---|---|
| 4,296,995 | 10/1981 | Bickel | 350/96.15 |
| 4,426,215 | 1/1984 | Murphy | 65/4.21 |
| 4,550,974 | 11/1985 | Murphy | 350/96.15 |
| 4,844,573 | 7/1989 | Gillham et al. | 350/96.17 X |
| 4,932,742 | 6/1990 | Tohme | 350/96.18 |

OTHER PUBLICATIONS

"Optical Fiber Sensors in the life Sciences" by Sigel, Jr. Non-Intermetric Approaches Fall 1990.

Primary Examiner—Akm E. Ullah
Attorney, Agent, or Firm—Ware, Fressola, Van Der Sluys & Adolphson

[57] ABSTRACT

A fiber optic sensor module, for use with an optical sensor of the type that senses a selected parameter and modifies a predetermined characteristic of a received optical signal in corresponding relation to changes in the sensed parameter and retransmits the modified signal, includes an optical signal source having a selected predetermined characteristic and optical connections for providing the optical signal to the optical sensor. Signals retransmitted from the optical sensor are received and are differentiated from the transmitted signal so that the modified signal may be detected to provide an electrical output corresponding to the extent the predetermined characteristic of the optical signal is modified. The module is connected to the optical sensor using an optical fiber so that the sensor may be remotely located from the module and easily disconnected therefrom so that the module may be reused while the sensor may be disposable.

22 Claims, 2 Drawing Sheets

FIBER OPTIC SENSOR MODULE

BACKGROUND OF THE INVENTION

1. Field of the Invention

The present invention relates to fiber optic sensors and more particularly to fiber optic sensor modules designed for use with remotely located sensor elements.

2. Description of the Prior Art

Optical fibers are rapidly becoming the transmission means of choice for conveying information between two different locations. In most instances optical fibers are thought of in relation to the communications industry in that they provide significantly greater bandwidths and information carrying capacity. However, a new use for optical fibers has been realized with the development of various types of fiber optic sensors.

Fiber optic sensors are becoming an accepted means for measuring and sensing all types of physical and chemical effects. Active and passive sensor elements have been developed and continue to be developed. An article by G. H. Siegel, Jr. entitled "Optical Fiber Sensors in the Life Sciences: Non-Interferometric Approaches", as found in Collection of Technical Papers. Fall 1990, published by Fiber Optic Materials Research Program at Rutgers University, contains an overview of many different types of optical fiber sensors. Unique fiber optic sensor applications are found in the Life Sciences involving in-vivo monitoring of blood gasses, as well as physical parameters such as pressure, temperature and flow and remote chemical and biochemical spectroscopy.

In general, fiber optic sensor elements respond to an optical interference generated by a chemical or physical event. The resulting optical interference is typically a change in optical wavelength, polarization angle, amplitude or rate of modulation. All fiber optic sensors require components for generating the optical signals for the sensor elements and for processing the optical signals generated by the sensor elements. These components are usually located in a separate housing remote from the sensor element which is connected by an optical fiber. In the medical field, a sensor can only be used once and therefore must be manufactured at the least possible cost. The use of such disposable fiber optic sensors is limited by the high cost of reliable optical processing elements.

SUMMARY OF THE INVENTION

The present invention contemplates a fiber optic sensor having a remote sensor element detachably connected to a sensor module by an optical fiber. Only the sensor element and the optical fiber need to be disposable while the reusable module contains the electro-optical components and optics integrated into one package.

Fiber optic modules have been used extensively in the past, particularly in the communications field and examples of such modules may be found in U.S. Pat. No. 4,932,742 issued Jun. 12, 1990, and pending U.S. patent application Ser. No. 467,798 filed Jan. 17, 1990 now U.S. Pat. No. 5,031,984, both commonly assigned with the present application.

The module described in U.S. Pat. No. 4,932,742 teaches a fiber optic wavelength division multiplexing module wherein light signals of different wavelengths may be multiplexed and demultiplexed. The module has both optical and electrical ports. In the application Ser. No. 467,798, an electro-optical module adopted for use in coupling information between an optical fiber and electrical wires is disclosed. The teachings of the patent and the application are incorporated herein by reference.

The fiber optic sensor module of the present invention uses a fused fiber optic coupler or a beam splitter integrated with active components such as optical emitters and detectors to form the module. Electronic circuitry is integrated into the sensor module to drive and control the active optical components of the module. A thermoelectric heater/cooler or a heater and thermister may be used to control temperature effects. Exiting the module is at least one optical port for connection to the fiber optic sensor element and various electrical connections for power, control and output signals. The optical port is in the form of an optical fiber pigtail or an optical connector.

Two embodiments of sensor modules have been developed to work with different types of sensor elements. For sensor elements causing a change of optical wavelength, such as phosphor elements, a wavelength selective module is utilized. Such a module will in general utilize wavelength division multiplexing techniques. For sensor elements causing a change in optical amplitude such as absorption/reflection type elements an optical signal splitter is utilized so that changes in optical amplitude may be detected.

A primary objective of the present invention is to provide a reusable fiber optic sensor module for use with a remotely located disposable fiber optic sensor element.

Another objective of the present invention is to provide a fiber optic sensor module having optical components such as a fiber optic coupler or a beam splitter integrated with active components such as optical emitters and detectors.

Another objective of the present invention is to provide a fiber optic sensor module including integrated electronic circuitry for driving, and controlling active optical components contained in the module.

Another objective of the present invention is to provide a fiber optic sensor module wherein all necessary elements are packaged in a small support housing for high sensitivity and low noise, both electrically and optically.

DETAILED DESCRIPTION OF THE PREFERRED EMBODIMENTS

Figure 1:
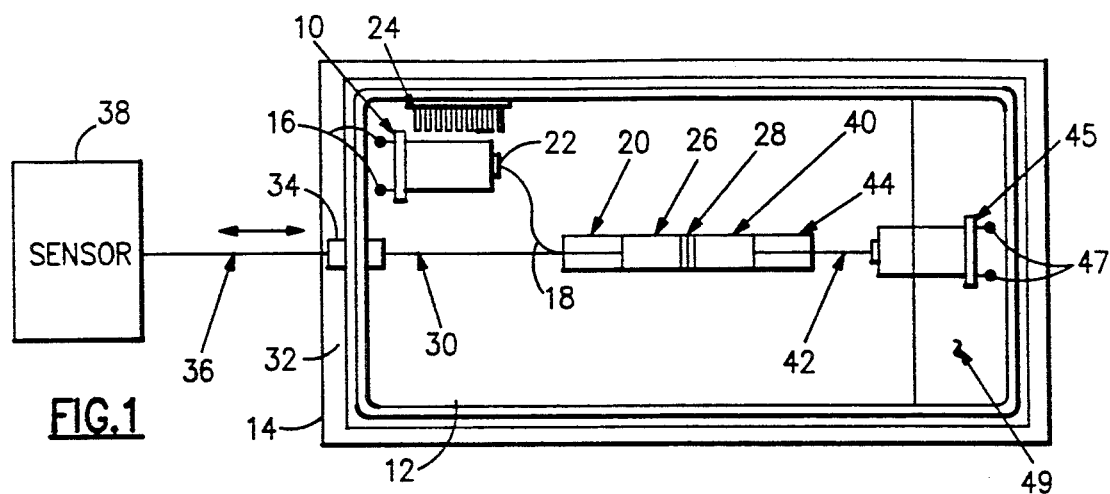
FIG. 1 is a plan view of a first embodiment of a fiber optic sensor system constructed in accordance with the present invention and shown with the module cover removed.

Referring to FIG. 1 there is shown a wavelength sensitive sensor module for use with sensor elements of the type that shift the optical wavelength. An optical source 10 in the form of an LED or laser in a TO18 can is mounted to a circuit board 12 disposed over a heatsink 14. The source 10 has electrical connections 16 for connection to a source driver. A fiber pigtail 18 extends from the source 10 and passes through a two fiber capillary tube 20. The source is adapted to provide light at a wavelength dependent upon the particular type of sensor to which the module is to be connected. In a typical embodiment the wavelength may be 470 nm. In some instances it may be desirable to incorporate a filter 22 at the output of the source to clean up the light so that only a very precise wavelength is passed through the filter.

Optical sources have a tendency to change wavelength with temperature variations. Therefore, a thermoelectric heater/cooler 24 is mounted adjacent the source 10 to maintain a relatively constant temperature. Preferably the temperature is raised to approximately 10 to 15 degrees C. over the highest expected ambient temperature. In place of a thermoelectric device a carbon block heater could be used in conjunction with a thermister for controlling the heat produced by the heater.

A one-quarter pitch graded index lens 26 has a focal point in juxtaposition with the end of fiber 18 and functions to collimate the light onto an optical filter 28. The optical filter is designed to provide a long wavelength path, so that the filter will pass long wavelengths while shorter wavelengths will be reflected by the filter. Optical filters that may be used for this function are commonly referred as dichroic filters and examples of such filters may be found in U.S. Pat. No. 4,296,995. Examples of the use of such filters may be found in U.S. Pat. No. 4,932,742. Filter 28 and the optical source 10 are selected such that the wavelength produced by the optical source lies within the range of the shorter wavelengths which are reflected by the filter.

The graded index lens 26 refocuses the reflected light onto a sensor fiber 30 which extends to a module enclosure 32. Fiber 30 may pass through the enclosure to provide an optical fiber pigtail or may be terminated at the enclosure at a optical connector 34.

An optical fiber 36 connected to connector 34 extends to the remote location of a sensor element 38. Optical fiber 36 is preferably a multimode large 200 micron diameter fiber having a large NA and may be made of plastic or glass. The sensor element may be any one of the wavelength sensitive types described in the aforementioned article of G. H. Siegel, Jr. The sensor element for the embodiment of the invention described in FIG. 1 receives the light from optical fiber 36 having a wavelength as determined by the optical source 10 and the filter 22. The sensor 38 responds to a particular event or changes in a particular parameter and converts the light to a longer wavelength and retransmits the longer wavelength light back to the sensor module. Thus, the optical fibers 30 and 36 carry light bidirectionally to and from the sensor 38. Shorter wavelength light is carried to the sensor and longer wavelength light from the sensor.

The graded index lens 26 again collimates the light and the optical filter 28 now passes the longer wavelength light to another one-quarter pitch graded index lens 40 which functions to focus the returned light onto the end of an optical fiber 42. The optical fiber 42 is accurately positioned at the focal point of the graded index lens 40 by a single fiber capillary tube 44. The optical fiber 44 is connected to a detector 45 which may be selected from any one of a number of suitable detectors having a wavelength sensitivity range within the wavelengths used by the sensor. The detector may be a low level silicon detector provided in a TO 18 can. Detector 45 converts the received light into an electrical signal provided on electrical output leads 47.

The electronics used to drive and control the module may be provided separately from the module in which case electrical connection 16 will be connected to a light source driver while leads 47 will be connected to a high gain amplifier for providing an output signal which will vary in corresponding relation to the parameter sensed by the sensor element 38. Preferably the electronic components are mounted in the module in a region shown as 49. Electrical connections would extend from the module to provide electrical power thereto for driving the optical source driver and the thermoelectric heater/cooler or carbon block heater. The power would also be used for the high gain amplifier which would have outputs extending out of the module. Preferably the optical sensor receives pulsed light and therefore the electronics would also include a pulse generator for controlling the signal provided to the optical source driver.

The module is preferably enclosed and includes a cover which is not shown.

Figure 2:
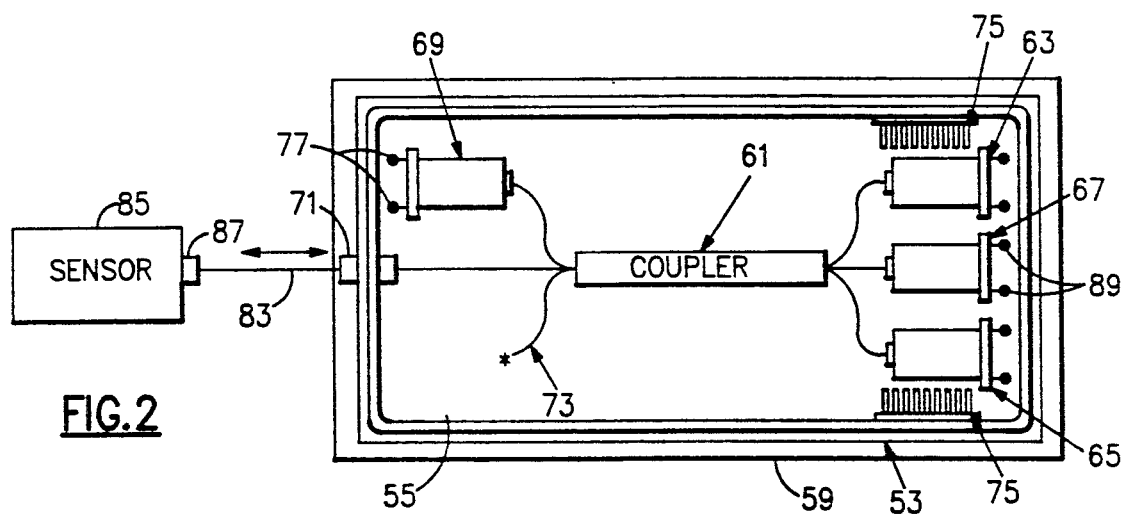
FIG. 2 is a plan view of a second embodiment of a fiber optic sensor system shown with the module cover removed.

Referring to FIG. 2 there is shown another embodiment of the present invention in the form of an amplitude sensitive module which is used in conjunction with a sensor element which responds to sensed parameters to change the amplitude of reflected light. In this case the module includes an enclosure 53 having a bottom portion 55 and a top cover not shown. The module may or may not, depending upon the application, be mounted on a heat sink 59.

Internal to the module there is shown a 3×3 fused coupler 61 which has three pigtails extending from each end. Two pigtails at one end are connected to two optical sources 63 and 65. At the same end another pigtail is connected to a detector 67. At the other end of the coupler one pigtail is connected to a detector 69 and one to a connector 71. The remaining pigtail is not used and is terminated at 73. The fused coupler is preferably a low loss fused biconical taper optical coupler as shown and described in U.S. Pat. Nos. 4,426,215 and 4,550,974.

Thermoelectric heaters/coolers 75 or carbon block heaters in conjunction with thermisters are mounted within the module proximate to the sources 63 and 65. The heaters/coolers 75 are provided so that the optical sources provide constant amplitude light despite variations in ambient temperature.

The two sources 63 and 65 may be LED's or laser sources provided in standard TO18 cans; however, the sources are selected to provide different wavelengths of light. The fused coupler 61 has better than 50 dB directivity and low insertion loss, and functions to receive light from the two sources. The light is then divided three ways into the three fiber pigtails extending therefrom. One of the pigtails is connected to the detector 69 to provide a reference signal level. The reference detector 69 converts the light to an electrical signal which is provided on electrical connections 77 to a feedback circuit not shown. The feedback circuit is connected to optical source drivers for driving the optical sources 63 and 65 so that the sources maintain a constant light output.

Connected to connector 71 is an optical fiber 83 which extends to a remote optical sensor 85. The optical sensor 85 is of the type that causes a change in light amplitude in accordance with a sensed parameter and reflects the light back through fiber 83. Optical fiber 83 is preferably a multimode large 200 micron diameter fiber having a large NA and may be made of plastic or glass.

Disposed in the path of fiber 83 and close to sensor 85 is a dichroic filter 87 constructed to pass longer wavelength light and reflect shorter wavelength light. The optical sources 63 and 65 are selected so as to provide light having shorter and longer wavelengths so that filter 87 passes the longer wavelengths, but reflects the shorter wavelengths. Thus, the shorter wavelength light passing through fiber 83 is reflected back to the module while the longer wavelength light is passed by the filter into the sensor 85 where its amplitude is changed in accordance with the sensed parameter.

The reflected light and the amplitude modified light are passed through the fused coupler 61 and portions of the light are provided to the detector 67 which converts the light to two electrical signals one for each wavelength. The electrical signals are provided at electrical outlet 89.

Electronic components including a high gain amplifier and a comparator are connected to outlet 89 for comparing the two signals. The difference in the amplitudes of two signals corresponds to the parameter measured by the sensor element 85.

A unique advantage of the present invention is that light interference common to the system, such as interface reflections, fiber bend, fiber attenuation and temperature effects are cancelled by using the two wavelength approach. Both light signals are affected by these common parameters so that the only difference in the light signals is that created by the sensor 85.

Examples of wavelength pairs which may be used in the module of FIG. 2 are 470 nm and 555 nm or 560 nm and 810 nm.

Figure 3:
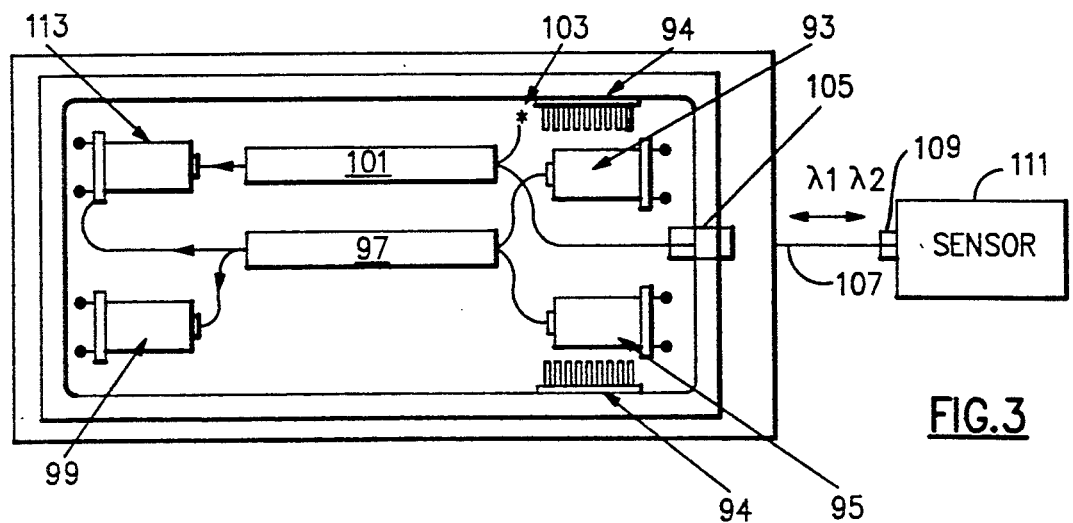
FIG. 3 is a plan view of a third embodiment of a fiber optic sensor system shown with the module cover removed.

Referring to FIG. 3 there is shown a second embodiment of an amplitude sensitive module. In this embodiment the enclosure is essentially similar to that of the embodiment of FIG. 2, but the optical components differ. Optical sources 93 and 95 provide light of different wavelengths to a first fused 2×2 optical coupler 97. A first output of the first coupler is connected to a feedback detector 99 which functions in a manner similar to detector 69 of FIG. 2 and provides an electrical outlet for controlling the driving power to the optical sources 93 and 95. A second output of coupler 97 is provided to optical coupler 101 which is also a fused 2×2 optical coupler. Of the two outputs of optical coupler 101, one output is not used and it is terminated as shown at 103 while the other output is provided to a connector 105 at an output of the module. Connector 105 is connected to an optical fiber 107 which is further connected to a filter 109 and an optical sensor 111 in a manner similar to the components of FIG. 2. The reflected and modified light returned on fiber 107 is passed through coupler 101 and a portion thereof is provided to a measurement detector 113 which functions in a manner as that of detector 67 shown in FIG. 2. The module shown in FIG. 3 includes all the electronic circuitry used with the module of FIG. 2.

Couplers 97 and 101 are preferably low loss fused biconical taper optical couplers as described in U.S. Pat. Nos. 4,426,215 and 4,550,974.

The use of two couplers connected in series as shown in FIG. 3 offers an advantage when the return light from the sensor element is small. If the splitting ratio of coupler 97 is 50/50 the optical return loss will only be slightly more than −3 dB. In the case of a 3×3 coupler, the return loss will be more than −5 dB. The splitting ratio of the couplers 97 and 101 can also be varied and selected to optimize the sensor module for specific applications. Selecting different splitting ratios in the 3×3 coupler is more limited.

Figure 4:
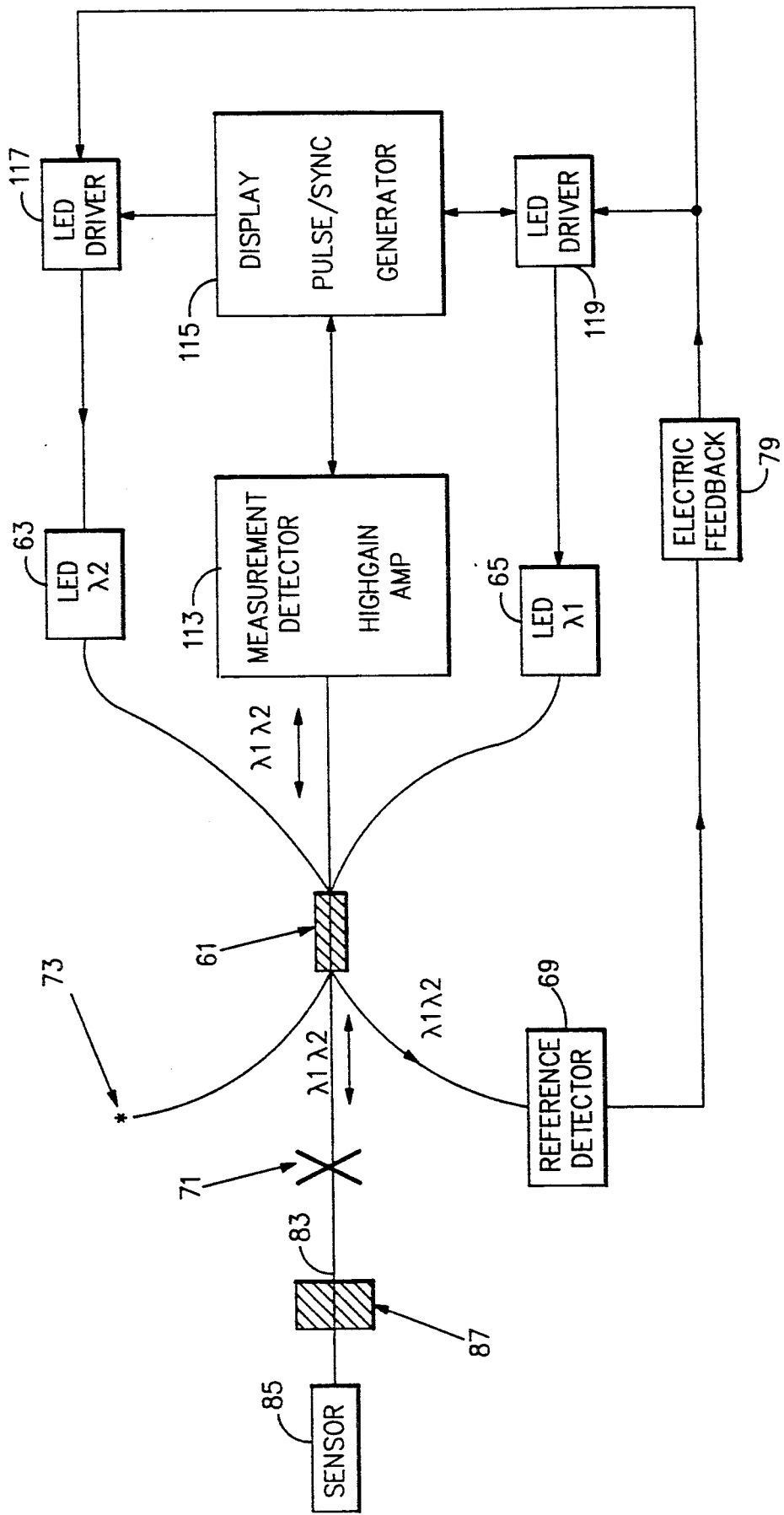
FIG. 4 is a schematic block diagram of the fiber optic sensor system of FIG. 2.

Referring to FIG. 4 there is shown a block diagram of a sensor system as it would be preferably used with the sensor module of FIG. 2. Only minor modifications would be required to adopt the block diagram of FIG. 4 for use with the sensor module of FIG. 3. The optical sources 63 and 65 provide optical signals to the coupler 61 as is clearly shown in FIG. 2. However, the output of the reference detector 69 is provided to an electric feedback path 79 and is used to control a pair of source drivers 117 and 119 which provide the driving power for the optical sources 63 and 65. The reflected signals returning from coupler 61 are provided to a high gain amplifier and a comparator circuit shown as block 113, the output of which may be provided to block 115 which includes a display device and a pulse synchronization generator. The pulse synchronization generator provides outputs to the source drivers 117 and 119 so that the drivers may be alternately pulsed to provide the two light wavelengths to the sensor element at different times.

Thus, the present invention provides fiber optic sensor modules which may be used in conjunction with sensor elements which respond to a sensed parameter by either changing a light wavelength or changing light amplitude. In one embodiment an optical source provides a precise wavelength which is shifted by the optical sensor and the wavelength shift is sensed to provide an electrical output. In the other embodiment two optical sources of different wavelength are utilized and the optical outputs therefrom are passed through common optical and electro optical components except for the sensor element so that changes in sensor element output may be accurately detected. The amplitude sensitive modules uniquely use fused biconical taper optical couplers which have excellent directivity and low return loss.

The necessary optical and electrical components for the sensor module may be advantageously packaged in a single integrated unit which is located remote from the optical sensor so that the module may be reused and disconnected from the sensor which in most cases is considered a throwaway item.

The modules are temperature controlled using either thermoelectric heaters/coolers or carbon block heaters in conjunction with thermisters to maintain the temperature at a selected differential from the maximum ambient temperature so that changes in ambient temperature will not have an effect on the optical signals generated by the sources.

What is claimed is:
1. An optical sensing system, comprising:
an optical sensor element of the type that senses a selected parameter and modifies a predetermined characteristic of a received optical signal in corresponding relation to changes in the sensed parameter and retransmits the modified signal;
an optical sensor module including means for generating an optical signal having a selected condition of said predetermined characteristic, means for providing at least a portion of said optical signal to a module port for transmission, means for receiving an optical signal at said port, said received optical signal having the condition of said predetermined characteristic modified, and means for providing an electrical output corresponding to the extent of modification of the condition of said predetermined characteristic;

an optical fiber extending between and connected to one of said module port and said optical sensor; and connecting means associated with said optical fiber for connecting said fiber to the other of said sensor and module port, whereby the sensor may be remotely located from said module and selectively disconnected therefrom.

2. An optical sensor system as described in claim 1, wherein the optical sensor element modifies the wavelength of the received optical signal and said module is sensitive to the wavelength of the retransmitted modified signal.

3. An optical sensor system as described in claim 1, wherein the optical sensor element modifies the amplitude of received optical signal and the module is a signal amplitude sensitive module.

4. An optical sensor module for use with an optical sensor element of the type that senses a selected parameter and modifies a predetermined characteristic of a received optical signal in corresponding relation to changes in the sensed parameter and retransmits the modified signal, said optical sensor module comprising:

means for generating a first optical signal having a selected condition of said predetermined characteristic;

means for directing at least a portion of said first optical signal to said sensor;

means for receiving a modified optical signal from said sensor; and means for selectively differentiating between said modified optical signal and an unmodified signal and for providing an output corresponding to the extent of modification of the condition of said predetermined characteristic of the modified optical signal.

5. An optical sensor module as described in claim 4, wherein the predetermined characteristic modified by the sensor element is wavelength and the means for generating a first optical signal comprises an optical signal source generating light at a selected wavelength as the selected condition.

6. An optical sensor module as described in claim 5, wherein the means for directing at least a portion of said first optical signal comprises a wavelength selective optical filter which reflects light having the selected wavelength and passes light having a different wavelength, said reflected light being directed to said sensor.

7. An optical sensor module as described in claim 6, wherein said means for directing at least a portion of said first optical signal additionally includes a lens means for collimating the light and for directing said collimated light to said filter.

8. An optical sensor module as described in claim 7, wherein said means for receiving said modified optical signal from said sensor includes said lens means for collimating and directing the light of the received modified optical signal onto said filter, said modified signal being modified by the sensor element by changing the wavelength of the light of said retransmitted optical signal.

9. An optical sensor module as described in claim 8, wherein said means for selectively differentiating between said modified optical signal and an unmodified signal comprises:

said wavelength selective optical filter, said modified optical signal having a different wavelength than said unmodified optical signal so that said filter passes said modified optical signal; and detector means for detecting the modified optical signal passed by said filter and for providing the output corresponding to the extent of modification of the condition of said predetermined characteristic of the modified optical signal.

10. An optical sensor module as described in claim 4, additionally comprising means for controlling the temperature of the means for generating a first optical signal.

11. An optical sensor module as described in claim 4, wherein the means for selectively differentiating between said modified optical signal and an unmodified signal additionally comprises a high gain amplifier for amplifying the output.

12. An optical sensor module as described in claim 4, wherein the predetermined characteristic modified by the sensor element is optical signal amplitude and said means for generating a first optical signal generates a signal having a selected amplitude as the selected condition.

13. An optical sensor module as described in claim 12, wherein the means for selectively differentiating between said modified optical signal and an unmodified signal comprises an optical detector for receiving the modified optical signal and for providing an electrical output corresponding to the extent of modification of the predetermined characteristic.

14. An optical sensor module as described in claim 12, wherein the means for directing at least a portion of said optical signal to said sensor comprises an optical coupler.

15. An optical sensor module as described in claim 14, wherein the optical coupler is a fused biconical taper coupler.

16. An optical sensor module as described in claim 14, additionally comprising an optical detector, said optical coupler providing a portion of the optical signal to the optical detector, said optical detector providing an output which is fed back to the means for generating a first optical signal so that the means for generating a first optical signal generates a constant amplitude signal.

17. An optical sensor module for use with an optical sensor device of the type that has a sensor element for sensing a selected parameter and modifying the amplitude of a received optical signal in corresponding relation to changes in the sensed parameter and retransmits the modified first optical signal, said sensor device further including means for passing a first optical signal to the sensor element and for reflecting a second optical signal back to the module, said optical sensor module comprising:

means for generating said first optical signal having a selected amplitude;

means for generating said second optical signal having an amplitude identical to that of the first optical signal, but having a different wavelength;

an optical coupler for directing at least a portion of said first and second optical signals to said sensor device;

an optical detector, said optical coupler providing a portion of the first optical signal to said optical detector, said optical detector providing an output which is fed back to the means for generating a first optical signal so that the means for generating a first optical signal generates a constant amplitude signal;

means for receiving a modified first optical signal from said sensor device and said second optical signal from said sensor device; and means for selectively differentiating between said modified first optical signal and said second optical signal to provide an output corresponding to the amplitude difference between said modified first optical signal and said second optical signal.

18. An optical sensor module as described in claim 17, wherein both first and second signals are provided to said optical detector, the output of which controls the optical signal amplitude produced by said first and second generating means to assure that said means for generating optical signals provide constant amplitude signals.

19. An optical sensor module as described in claim 18, wherein the optical coupler comprises a 3×3 optical coupler having three optical paths at each end thereof, the optical paths at a first end being connected to the first and second signal generating means and to the means for selectively differentiating, while the optical paths at a second end are connected to the means for directing the signal to the sensor and to the detector.

20. An optical sensor module as described in claim 18, wherein the optical coupler comprises first and second series connected 2×2 couplers each having two optical paths at each end thereof, the paths at one end of a first optical coupler being connected to said first and second means for generating optical signals, the paths at a second end of said first optical coupler being connected to the detector and to a path at one end of the second optical coupler, the other path of the second optical coupler at said one end being connected to said means for selectively differentiating while one of said paths at a second end of the second optical coupler is connected to said means for directing at least a portion of said signal to said sensor.

21. An optical sensor module as described in claim 18, additionally comprising means for controlling said means for generating said first and second optical signals so that said means alternately generate pulses of said first and second optical signals and said means for selectively differentiating alternately receives said modified optical signal and said second signal and includes a comparator means for comparing the amplitudes of said modified optical signal and said second signal.

22. An optical sensor module as described in claim 18, wherein the output of the optical detector is provided to optical signal source drivers via a feedback path said optical signal source drivers controlling said first and second generating means.

* * * * *